R. A. HEINKE.
NUT LOCK.
APPLICATION FILED SEPT. 19, 1917.

1,263,241.

Patented Apr. 16, 1918.

Witnesses

Inventor
R. A. Heinke

By

Attorneys

UNITED STATES PATENT OFFICE.

ROY A. HEINKE, OF DUNBAR, NEBRASKA.

NUT-LOCK.

1,263,241.     Specification of Letters Patent.     Patented Apr. 16, 1918.

Application filed September 19, 1917. Serial No. 192,208.

*To all whom it may concern:*

Be it known that I, ROY A. HEINKE, a citizen of the United States, residing at Dunbar, in the county of Otoe, State of Nebraska, have invented certain new and useful Improvements in Nut-Locks; and I do hereby declare the following to be a full, clear, and exact description of the invention, such as will enable others skilled in the art to which it appertains to make and use the same.

This invention relates to improvements in nut and bolt locks.

One object of the present invention is to provide a novel and simple device of this character which is easy of operation and durable and effective in its use.

Another object is to provide a device of this character which is of such nature that the locking pin does not need to be entirely removed when locking or unlocking the device.

Other objects and advantages will be apparent from the following description when taken in connection with the accompanying drawing.

Figure 1:
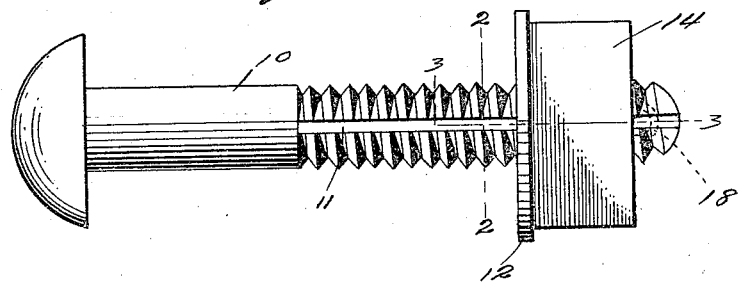
Figure 1 is an elevation of a nut and bolt lock made in accordance with my invention.
Figure 2:
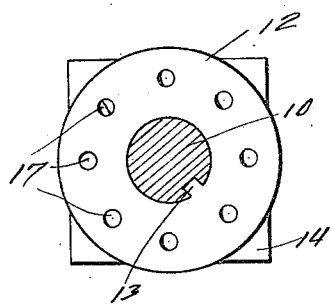
Fig. 2 is a section on line 2—2 of Fig. 1.
Figure 3:
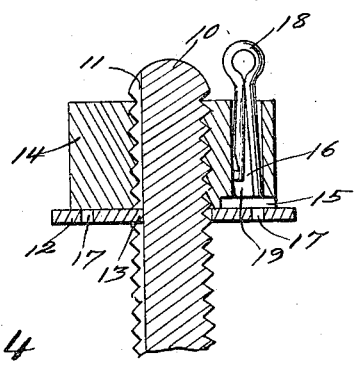
Fig. 3 is a longitudinal sectional view taken on the line 3—3 of Fig. 1, showing the device in unlocked position.
Figure 4:
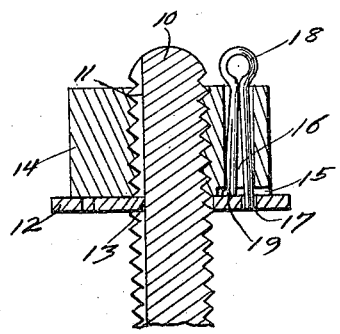
Fig. 4 is a similar sectional view showing the parts in locked position.

Referring particularly to the accompanying drawing, 10 represents a bolt having the longitudinally extending channel 11 in the threaded portion thereof. This channel is preferably rectangular in cross section. A washer plate 12 is engaged on the bolt, and formed on the wall of the central opening of the washer is a projecting lug 13 which is angular in outline and fits within the said groove or channel 11. A nut 14 is engaged on the threaded portion of the bolt and arranged to be turned upwardly against the washer plate, as clearly illustrated in the accompanying drawing. In the inner face of the nut, and at one corner thereof, there is formed a recess 15, and formed through the nut, in parallel relation to the central bore thereof, and through the bottom wall of the recess 15, is an opening 16.

Through the washer plate, adjacent the outer edge thereof, there are formed the openings 17 which are arranged to register, successively, with the opening 16. Removably disposed through the opening of the nut, at 16, is a split key or cotter pin 18, one of the legs being shorter, as shown at 19, and terminating at the face of the plate adjacent the nut, while the other leg is arranged to pass into the opening 17 of the plate.

It will be noted that the legs of the cotter pin are normally sprung apart so as to fit snugly within the opening of the nut, whereby the longer leg will bear against the wall of the opening 17, at the outer part thereof, when the pin is turned in that direction, and be free from contact with the wall when turned in the opposite direction. Thus when the key is turned outwardly a friction contact between the longer leg and the wall of the opening 17 of the washer plate will hold the key in position against accidental removal and the washer plate from movement. Thus, by reason of the fact that the key is prevented from accidental disengagement, the nut will be firmly held from rotation on the bolt in either direction.

The extremity of the shorter leg of the cotter pin is formed with a laterally directed portion which snaps beneath the inner face of the nut, within the recess 15 when it is pushed in to the limit of its movement, thus providing further means whereby the pin cannot become disengaged from the nut.

What is claimed is:

A nut lock including a bolt having a longitudinal groove in the threaded portion thereof, a washer disposed on the bolt and having a projection engaged in the said groove, the said washer having an opening adjacent the peripheral edge thereof, a nut engaged on the bolt outwardly of the washer, said nut having a recess in the inner face of one corner thereof, said recessed corner having an opening arranged for registry with the opening of the washer, and a split pin engaged through the opening of the nut and having a longer leg engaged in the opening of the washer and a shorter leg terminating against the face of the washer, the legs of said pin being normally sprung apart so that the longer leg bears frictionally against the outer portion of the wall of the opening of the washer.

In testimony whereof, I affix my signature in the presence of two witnesses.

ROY A. HEINKE.

Witnesses:
 ELSIE WEILER,
 OSCAR WEILER.

Copies of this patent may be obtained for five cents each, by addressing the "Commissioner of Patents, Washington, D. C."